US 8,649,995 B2

(12) United States Patent
Thulasidasan et al.

(10) Patent No.: US 8,649,995 B2
(45) Date of Patent: Feb. 11, 2014

(54) SYSTEM AND METHOD FOR EFFICIENT TEST CASE GENERATION USING INPUT DEPENDENCY INFORMATION

(75) Inventors: Nair Pradosh Thulasidasan, Bangalore (IN); Tenkarai Sankaran Venkataramanan, Bangalore (IN)

(73) Assignee: Infosys Technologies, Ltd., Bangalore (IN)

( * ) Notice: Subject to any disclaimer, the term of this patent is extended or adjusted under 35 U.S.C. 154(b) by 366 days.

(21) Appl. No.: 13/216,542

(22) Filed: Aug. 24, 2011

(65) Prior Publication Data

US 2012/0259576 A1    Oct. 11, 2012

(30) Foreign Application Priority Data

Apr. 7, 2011   (IN) .......................... 1218/CHE/2011

(51) Int. Cl.
  *G06F 19/00*       (2011.01)
(52) U.S. Cl.
  USPC ........... 702/123; 702/119; 714/38; 714/38.11
(58) Field of Classification Search
  USPC ......... 702/119–123; 705/7.13, 7.26; 235/375; 709/203, 223, 224; 455/446; 706/14, 706/50; 714/38, 38.11; 717/102, 168, 176
  See application file for complete search history.

(56) References Cited

U.S. PATENT DOCUMENTS

| | | | |
|---|---|---|---|
| 4,835,372 A | 5/1989 | Gombrich et al. | |
| 5,734,837 A | 3/1998 | Flores et al. | |
| 5,774,661 A | 6/1998 | Chatterjee et al. | |
| 5,826,239 A | 10/1998 | Du et al. | |
| 5,937,388 A | 8/1999 | Davis et al. | |
| 6,125,390 A | 9/2000 | Touboul | |
| 6,279,124 B1 * | 8/2001 | Brouwer et al. | ........... 714/38.11 |
| 6,393,290 B1 | 5/2002 | Ufongene | |
| 6,473,794 B1 | 10/2002 | Guheen et al. | |
| 6,714,976 B1 | 3/2004 | Wilson et al. | |
| 6,988,088 B1 | 1/2006 | Miikkulainen et al. | |
| 7,328,261 B2 | 2/2008 | Husain et al. | |
| 7,364,067 B2 | 4/2008 | Steusloff et al. | |
| 7,509,343 B1 | 3/2009 | Washburn et al. | |
| 7,587,715 B1 | 9/2009 | Barrett et al. | |
| 7,613,804 B2 | 11/2009 | Raden et al. | |
| 7,707,133 B2 | 4/2010 | Das et al. | |
| 2002/0055849 A1 | 5/2002 | Georgakopoulos et al. | |
| 2002/0059456 A1 | 5/2002 | Ha et al. | |
| 2002/0078174 A1 | 6/2002 | Sim et al. | |
| 2002/0133491 A1 | 9/2002 | Sim et al. | |
| 2003/0229890 A1 | 12/2003 | Lau et al. | |
| 2004/0205182 A1 | 10/2004 | Geddes | |
| 2005/0010880 A1 | 1/2005 | Schbert et al. | |

(Continued)

*Primary Examiner* — John H Le
(74) *Attorney, Agent, or Firm* — LeClairRyan, a Professional Corporation (57) ABSTRACT

A system and method for providing an efficient test case generator is disclosed. A test case project is established upon request from a user, via a user interface, to test an item. The test case project includes a plurality of fields and corresponding designated values to be tested. A first set of identified fields of the plurality are received, wherein the first set includes two or more fields identified by the user as having a dependent relationship with at least one another. A first relational field cluster for the first set of related fields and their values is created. A test case generation technique is performed on the first relational field cluster to compute all relevant test conditions for the first relation field cluster. Results of the computed test conditions for the first relational field cluster are displayed to the user via the user interface.

21 Claims, 5 Drawing Sheets

(56) References Cited

U.S. PATENT DOCUMENTS

| | | |
|---|---|---|
| 2005/0060224 A1 | 3/2005 | Ricketts |
| 2005/0091269 A1 | 4/2005 | Gerber et al. |
| 2005/0278202 A1 | 12/2005 | Broomhall et al. |
| 2006/0004767 A1 | 1/2006 | Diaconu et al. |
| 2006/0067252 A1 | 3/2006 | John et al. |
| 2006/0112375 A1 | 5/2006 | Schneider |
| 2006/0287890 A1 | 12/2006 | Stead et al. |
| 2007/0016829 A1* | 1/2007 | Subramanian et al. ......... 714/38 |
| 2007/0168225 A1 | 7/2007 | Haider et al. |
| 2007/0282659 A1 | 12/2007 | Bailey et al. |

* cited by examiner

SYSTEM AND METHOD FOR EFFICIENT TEST CASE GENERATION USING INPUT DEPENDENCY INFORMATION

This application claims the benefit of Indian Patent Application Filing No. 1218/CHE/2011, filed Apr. 7, 2011, which is hereby incorporated by reference in its entirety.

FIELD

The present disclosure relates generally to testing systems and methods and, in particular, a system and method of efficient test case generation using input dependency information.

BACKGROUND

There are various tools available in the market which serve to test an item, such as a product or service, using various test case generation algorithms. One such testing method is the Cartesian Product or array method in which every possible value for each input field are tested to identify failures in the tested item. The Cartesian Product ensures maximum coverage of the tested item as all the possible input scenarios are considered. Also, using the Cartesian Product provides the tester with an understanding of all the generated test cases for the tested item. However, the Cartesian Product has a significant disadvantage as the user is required to input all the possible input values. Another disadvantage is that the sheer number of input variables usually leads to an overwhelming number of test cases which the testing software must computer for and the tester must review and evaluate. This is undesirable as the process is not only time intensive but also costly as it requires significant computational resources in order to test every possible case.

Another testing method that is used to test an item is an Orthogonal Array method. The Orthogonal Array method involves testing a majority of common test case scenarios to identify potential failures in the tested item. Although the Orthogonal Array method is optimal in comparison to the Cartesian Array method, the Orthogonal Array method has disadvantages in that not all the possible scenarios are considered. Further, the Orthogonal Array method is not a complete solution as a change in one or more of the input fields can lead to inconsistencies in the testing results which further complicates the ultimate goal which the tester is trying to achieve.

What is needed is a system and method which tests all the possible input scenarios without requiring the time intensiveness of repeatedly inputting, and computing, all possible input fields and variables.

SUMMARY

In an aspect, a method of providing an efficient test case generator. The method comprises establishing a test case project upon request from a user via a user interface to test an item. The test case project includes a plurality of fields and corresponding designated values to be tested for the item. The method comprises receiving, via the user interface, a first set of identified fields of the plurality, wherein the first set includes two or more fields identified by the user as having a dependent relationship with at least one another. The method comprises creating, using one or more processors, a first relational field cluster for the first set of related fields and their associated values and performing a test case generation technique on the first relational field cluster to compute all possible test conditions among the two or more identified fields and their associated values in the first set. The method comprises displaying results of the computed test conditions for at least the two or more identified fields and their associated values of the first relational field cluster.

In an aspect, a non-transitory machine readable medium having stored thereon instructions for providing an efficient test case generator module. The medium comprising machine executable code which, when executed by at least one machine, causes the machine to establish a test case project upon request from a user via a user interface to test an item. The test case project includes a plurality of fields and corresponding designated values to be tested for the item. The code causes the machine to receive, via the user interface, a first set of identified fields of the plurality, wherein the first set includes two or more fields identified by the user as having a dependent relationship with at least one another. The code causes the machine to create a first relational field cluster for the first set of related fields and their associated values. The code causes the machine to perform a test case generation technique on the first relational field cluster to compute all possible test conditions among the two or more identified fields and their associated values in the first set. The code causes the machine to display results of the computed test conditions for at least the two or more identified fields and their associated values of the first relational field cluster.

In an aspect, a computer system comprises a memory and a processor that is coupled to the memory. The processor operative to establish a test case project upon request from a user via a user interface to test an item. The test case project including a plurality of fields and corresponding designated values to be tested for the item. The processor operative to receive, via the user interface, a first set of identified fields of the plurality, wherein the first set includes two or more fields identified by the user as having a dependent relationship with at least one another. The processor operative to create a first relational field cluster for the first set of related fields and their associated values. The processor operative to perform a test case generation technique on the first relational field cluster to compute all possible test conditions among the two or more identified fields and their associated values in the first set. The processor operative to display results of the computed test conditions for at least the two or more identified fields and their associated values of the first relational field cluster.

In one or more of the above aspects, the test case generation method is a Cartesian Product, although other methods are contemplated. In one or more of the above aspects, the input field and value data is entered manually by the user into the user interface, although the input field and value data can be loaded from memory.

In one or more of the above aspects, a second set of related fields are received from the user via the user interface, wherein the second set includes two or more fields identified by the user as having a dependent relationship with at least one another. A second relational field cluster is created that is associated with the second set of related fields and their associated values. A test case generation technique is performed on the second relational field cluster to compute all possible test conditions among the two or more identified fields and their associated values in the second relational field cluster. Results of the computed test conditions for the fields and values in the second relational field cluster set are displayed.

In one or more of the above aspect, the first relational field cluster includes one or more user defined logic rules associated among the two or more identified fields and their associated values. The results of the computed test conditions for at least the two or more identified fields and their associated values of the first set with the one or more logic rules are compared with the user defined logic rules. The results of these comparisons are displayed on the user interface, in which the results indicate which test cases are and/or are not in compliance with the one or more user defined logic rules.

DETAILED DESCRIPTION

Figure 1:
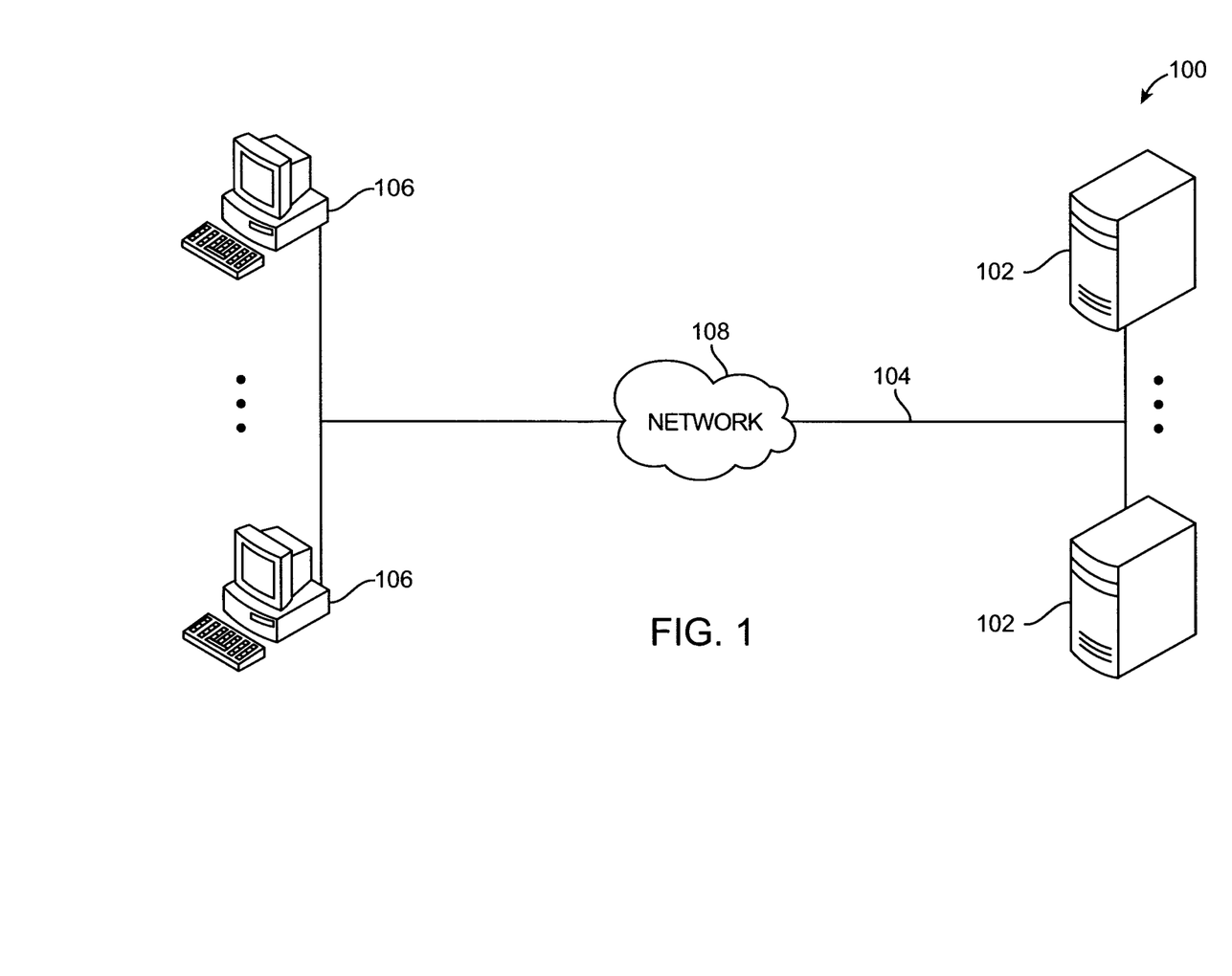
FIG. 1 illustrates a diagram of an example system environment that utilizes an efficient test case generation module in accordance with an aspect of the present disclosure.

FIG. 1 illustrates a diagram of an example system environment that implements and executes an efficient test case generator module and method of use in accordance with an aspect of the present disclosure. In particular, the example system environment 100 includes one or more servers 102(1)-102(n). The environment 100 includes one or more client devices 106(1)-106(n), although the environment 100 could include other numbers and types of devices in other arrangements. It should be noted that the term "network devices" can be referred to as encompassing one or more client devices, one or more servers and/or other hardware components in the system 100.

The servers 102(1)-102(n) are connected to a local area network (LAN) 104 and the client devices 106(1)-106(n) are connected to a wide area network 108, whereby the one or more client devices 106(1)-106(n) communicate with the one or more servers 102(1)-102(n) via the wide area network 108 and LAN 104. It should be noted that although the client device and/or server may be referred to herein in the plural, it is contemplated that only one client device and/or one server may be considered without being limiting to the language used herein. It should be understood that the particular configuration of the system 100 shown in FIG. 1 are provided for exemplary purposes only and is thus not limiting.

Client devices 106(1)-106(n) comprise computing devices capable of connecting to other computing devices, such as the servers 102(1)-102(n). Such connections are performed over wired and/or wireless networks, such as network 108, to send and receive data, such as for Web-based and non Web-based requests, receiving responses to requests and/or performing other tasks, in accordance with the novel processes described herein. Non-limiting and non-exhausting examples of such client devices 106(1)-106(n) include, but are not limited to, personal computers (e.g., desktops, laptops), mobile and/or smart phones, kiosks, tablet devices, PDAs and the like.

In an example, client devices 106(1)-106(n) may be configured to run a Web browser or other software module that provides a user interface for human users to interact with, request resources and/or information, as well as submit instructions over the network 108 to the one or more servers 102(1)-102(n) via Web-based or non Web-based applications. One or more Web-based or non Web-based applications may accordingly run on the servers 102(1)-102(n) that provide the requested data to the client device 106(1)-106(n) and/or perform the requested instructions on behalf of the user.

Network 108 comprises a publicly accessible network, such as the Internet, which handles communication between the client devices 106(1)-106(n) and the servers 102(1)-102(n). However, it is contemplated that the network 108 may comprise other types of private and public networks. Communications, such as requests from client devices 106(1)-106(n) and responses from servers 102(1)-102(n), preferably take place over the network 108 according to standard network protocols, such as the HTTP, UDP, and TCP/IP protocols and the like.

Further, it should be appreciated that the network 108 may include local area networks (LANs), wide area networks (WANs), direct connections and any combination thereof, as well as other types and numbers of network types. On an interconnected set of LANs or other networks, including those based on differing architectures and protocols, routers, switches, hubs, gateways, bridges, and other intermediate network devices may act as links within and between LANs, WANs and other networks to enable messages and other data to be sent and received between network devices. Also, communication links within and between LANs and other networks typically include twisted wire pair (e.g., Ethernet), coaxial cable, analog telephone lines, mobile cell towers, full or fractional dedicated digital lines including T1, T2, T3, and T4, Integrated Services Digital Networks (ISDNs), Digital Subscriber Lines (DSLs), wireless links including satellite links and other communications links known to those skilled in the relevant arts.

LAN 104 may comprise one or more private and public networks which provide secured access to the servers 102(1)-102(n). The servers 102(1)-102(n) comprise one or more network devices or machines capable of operating one or more Web-based and/or non Web-based applications that may be accessed by other network devices (e.g. client devices, other servers) in the network 108. Such data includes, but is not limited to Web page(s), image(s) of physical objects, user account information, and any other objects and information. It should be noted that the servers 102(1)-102(n) may perform other tasks and provide other types of resources.

As will be discussed in more detail below, one or more servers 102 may comprise a cluster of a plurality of servers which are managed by a network traffic management device (e.g. firewall, load balancer, web accelerator), gateway device, router, hub and the like. In an aspect, one or more servers 102(1)-102(n) may implement a version of Microsoft® IIS servers, RADIUS servers and/or Apache® servers, although other types of servers may be used and other types of applications may be available the on servers 102(1)-102(n).

Figure 2A:
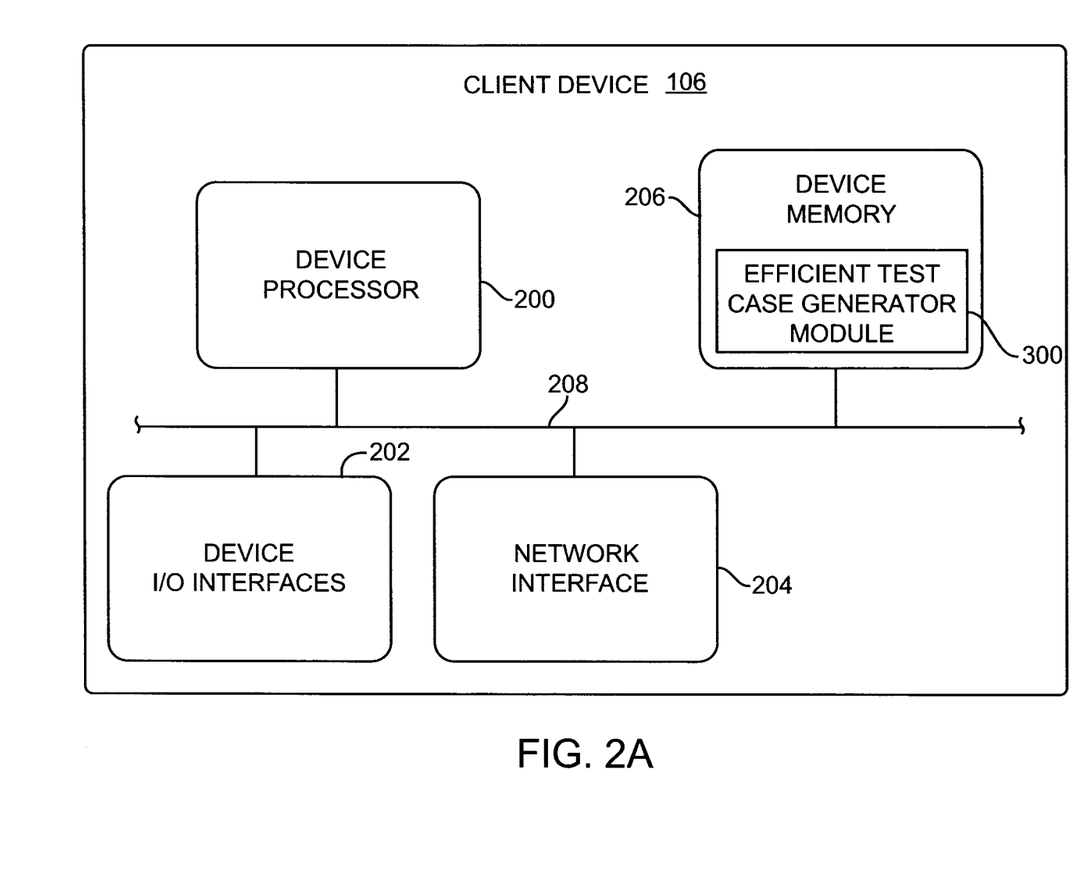
FIG. 2A illustrates a block diagram of a client device implementing at least a portion of the efficient test case generation module in accordance with an aspect of the present disclosure.

FIG. 2A illustrates a block diagram of a client device 106 shown in FIG. 1 in accordance with an aspect of the present disclosure. As shown in FIG. 2A, an example client device 106 includes one or more device processors 200, one or more device I/O interfaces 202, one or more network interfaces 204 and one or more device memories 206, all of which are coupled together by one or more buses 208. It should be noted that the device 106 could include other types and numbers of components.

Figure 2B:
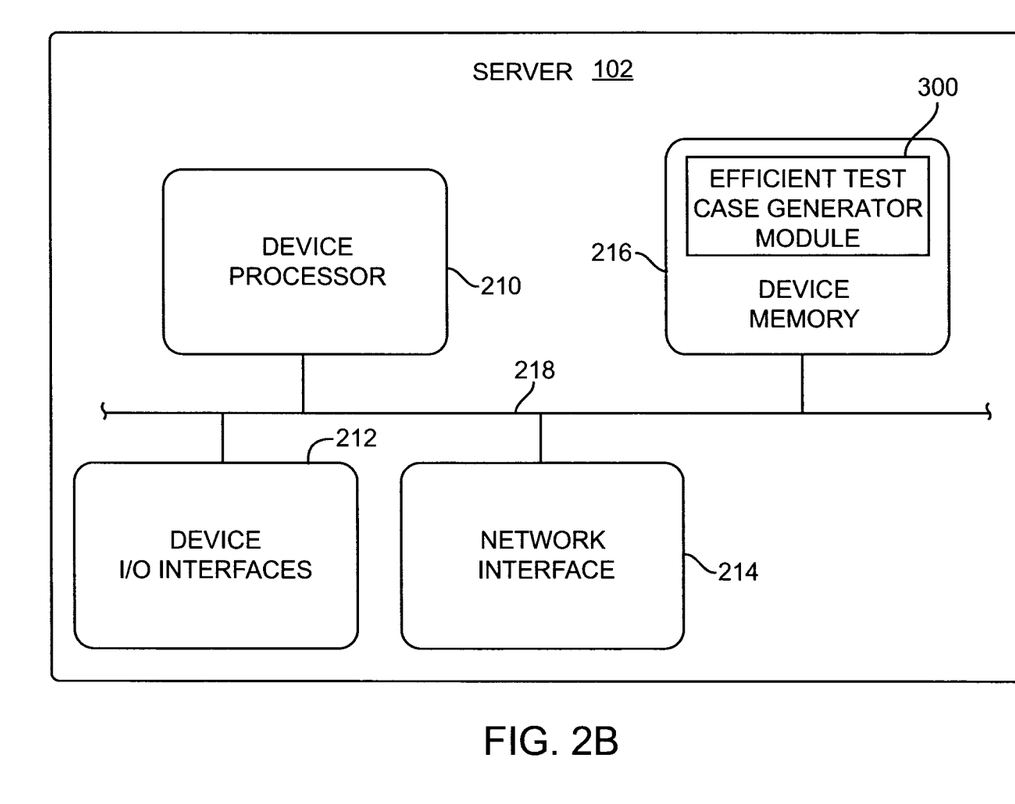
FIG. 2B illustrates a block diagram of a server implementing at least a portion of the efficient test case generation module in accordance with an aspect of the present disclosure.

FIG. 2B illustrates a block diagram of a server 102 shown in FIG. 1 in accordance with an aspect of the present disclosure. With regard to FIG. 2B, an example server 102 is shown which includes one or more device processors 210, one or more device I/O interfaces 212, one or more network interfaces 214 and one or more device memories 216, all of which are coupled together by one or more buses 218. It should be noted that the server 102 could include other types and numbers of components.

Device processor 200, 210 comprises one or more microprocessors configured to execute computer/machine readable and executable instructions stored in the respective local device memory 206, 216 or in a remote device memory (not shown). Such instructions are implemented by the processor 200, 210 to perform one or more functions described below. It is understood that the processor 200, 210 may comprise other types and/or combinations of processors, such as digital signal processors, micro-controllers, application specific integrated circuits ("ASICs"), programmable logic devices ("PLDs"), field programmable logic devices ("FPLDs"), field programmable gate arrays ("FPGAs"), and the like. The processor 200, 210 is programmed or configured to execute the process in accordance with the teachings as described and illustrated herein of the novel system and method described below.

Device I/O interfaces 202, 212 comprise one or more user input and output device interface mechanisms. The interface may include a computer keyboard, touchpad, touchscreen, mouse, display device, and the corresponding physical ports and underlying supporting hardware and software to enable communications with other network devices in the system 100. Such communications include, but are not limited to, accepting user data input and providing output information to a user, programming, accessing one or more memory devices and administering one or more functions to be executed by the corresponding network device and the like.

Network interface 204, 214 comprises one or more mechanisms that enable the client devices 106 and/or the servers 102 to engage in TCP/IP or other communications over the LAN 104 and network 108. However, it is contemplated that the network interface 204, 214 may be constructed for use with other communication protocols and types of networks. Network interface 204, 214 is sometimes referred to as a transceiver, transceiving device, or network interface card (NIC), which transmits and receives network data packets over one or more networks, such as LAN 104 and network 108.

In an example where the client device 106 and/or server 102 includes more than one device processor 200, 210 (or a processor 200, 210 has more than one core), each processor 200, 210 (and/or core) may use the same single network interface 204, 214 or a plurality of network interfaces 204, 214 to communicate with other network devices. Further, the network interface 204, 214 may include one or more physical ports, such as Ethernet ports, to couple its respective device with other network devices in the system 100. Moreover, the network interface 204, 214 may include certain physical ports dedicated to receiving and/or transmitting certain types of network data, such as device management related data for configuring the respective device, and the like.

Bus 208, 218 may comprise one or more internal device component communication buses, links, bridges and supporting components, such as bus controllers and/or arbiters. The bus enable the various components of the device 102, 106, such as the processor 200, 210, device I/O interfaces 202, 212, network interface 204, 214, and device memory 206, 216, to communicate with one another. However, it is contemplated that the bus may enable one or more components of its respective device 102, 106 to communicate with components in other devices as well. Example buses include Hyper-Transport, PCI, PCI Express, InfiniBand, USB, Firewire, Serial ATA (SATA), SCSI, IDE and AGP buses. However, it is contemplated that other types and numbers of buses may be used, whereby the particular types and arrangement of buses will depend on the particular configuration of the device 102, 106 which houses the bus.

Device memory 206, 216 of the client device 106 or server 102 comprises computer readable media, namely computer readable or processor readable storage media, which are examples of machine-readable storage media. Computer readable storage/machine-readable storage media may include volatile, nonvolatile, removable, and non-removable media implemented in any method or technology for storage of information. Such storage media stores computer readable/machine-executable instructions, data structures, program modules and components, or other data, which may be obtained and/or executed by one or more processors, such as device processor 200, 210. Such stored instructions allow the processor to perform actions, including implementing an operating system for controlling the general operation of the client device 106 and/or server 102 to perform one or more portions of the novel process described below.

Examples of computer readable storage media include RAM, BIOS, ROM, EEPROM, flash/firmware memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Such desired information includes data and/or computer/machine-executable instructions and which can be accessed by the network devices 102, 106.

The efficient test case generator module 300 performs the functions described below in relation to FIG. 4. The efficient test case generator module 300 is depicted in FIGS. 2A-2B as being within the memory 206, 216 for exemplary purposes only, and it should be appreciated the efficient test case generator module 300 may be alternatively located elsewhere. Generally, instructions embodying the efficient test case generator module 300 are executed by the device processor 200, 210 in the client device 106 and/or server 102, to perform the functions described in FIG. 4.

Figure 3:
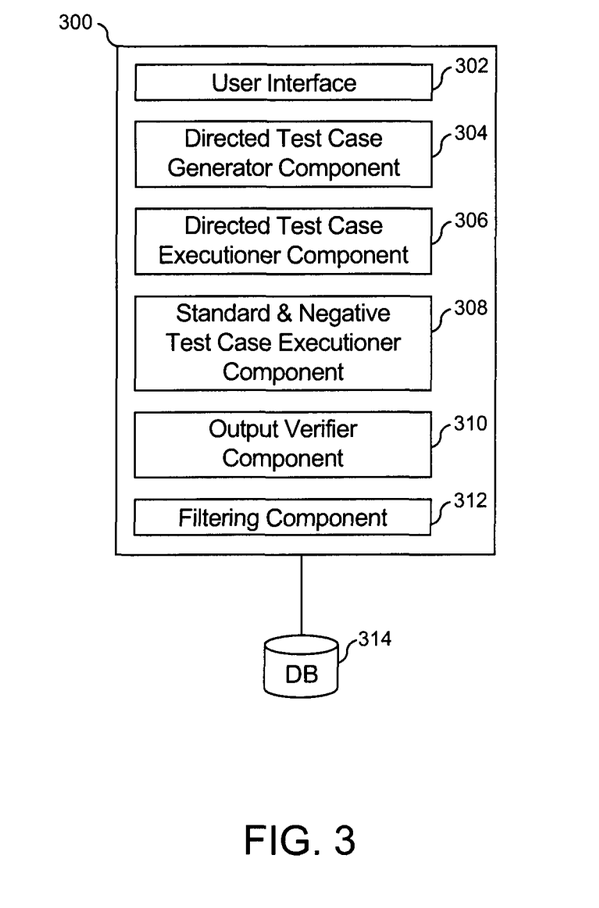
FIG. 3 illustrates a block diagram of the efficient test case generator module in accordance with an aspect of the present disclosure.

FIG. 3 illustrates a block diagram of the efficient test case generator module in accordance with an aspect of the present disclosure. In particular, the efficient test case generator module 300 includes a user interface module 302; a directed test case generator module 306; a standard and negative test case execution module 308 and an output verifier module 310. The efficient test case generator module 300 is configured to perform one or more test case generation techniques using provided input fields and associated values as well as utilizing information provided in respective relational field cluster definitions for the test case project, as discussed below. More details of the above modules are discussed below in relation to the process performed by the efficient test case generator module 300. It should be noted that the efficient test case generator module 300 may include additional, lesser and/or different modules than those shown in FIG. 3.

In general, the efficient test case generator module 300 allows the user to input a plurality of fields and their associated values for testing in a test case project. The efficient test case generator module 300 is configured to receive information from the user in which the information identifies two or more fields that are dependent or related to at least one another. The efficient test case generator module 300 then creates one or more relational field clusters which define these user identified field relationships to automatically and quickly calculate all the test cases by separately performing a test case generation technique on each created relational field cluster. This allows the efficient test case generator module 300 to calculate a reduced number of test case scenarios while providing results for all possible test combinations.

In particular, the filtering module 312 creates discreet and individual relational field clusters based on two or more input fields which have been identified by the user to be related or dependent on one another along with their respective values. In particular, upon the user designating, via the user interface, a set of fields containing two or more fields which are dependent on one another, the filtering module 312 creates and defines a specific relational field clusters for that respective identified set. It should be noted that the user is able to designate more than one set of fields that are dependent on one another, whereby the filtering module 312 can create multiple relational field clusters where each cluster is for each set of fields that the user designates are related or dependent on one another.

Each defined relational field cluster created by the filtering module 312 is processed separately by the efficient test case generator 300 in computing all the possible test cases in a test case project. In particular, the efficient test case generator 300 performs a separate test case generation technique on each created relational field cluster to generate all the possible test cases for that set of user identified fields that are related to one another. In an aspect, the efficient test case generator 300 performs the Cartesian Product as the test case generation technique, although other test case generation techniques are contemplated.

In the instance, that the test case project contains multiple defined relational field clusters, the efficient test case generator 300 will perform the Cartesian Product separately on each of the created relational field clusters. Additionally, the efficient test case generator 300 will output results for all the possible combinations within the number test cases which correspond to the number of values and fields defined in for each separate relational field cluster. By using the relationships and dependencies among fields to group them into a relational cluster, the efficient test case generator 300 is able to reduce the number of test case scenarios which it needs to perform.

For instance, in performing the Cartesian Product, the efficient test case generator module 300 utilizes the following Equation (1):

$$R^n \quad (1)$$

In Equation (1), R represents the number of R input values for a particular input field and n represents the number of fields that are to be tested. For example, for a test case project where there are 6 input fields, each of which contains 2 possible values, the Cartesian Product would require the efficient test case generator module 300 to compute 64 test cases (i.e. $2^6$). By the efficient test case generator module 300 grouping two or more identified fields into defined relational field clusters, the total n number of input fields is reduced as the efficient test case generator module 300 performs the test case generation method separately on each cluster. This results in a decrease in the total number of test cases which the efficient test case generator module 300 must compute for.

Figure 4:
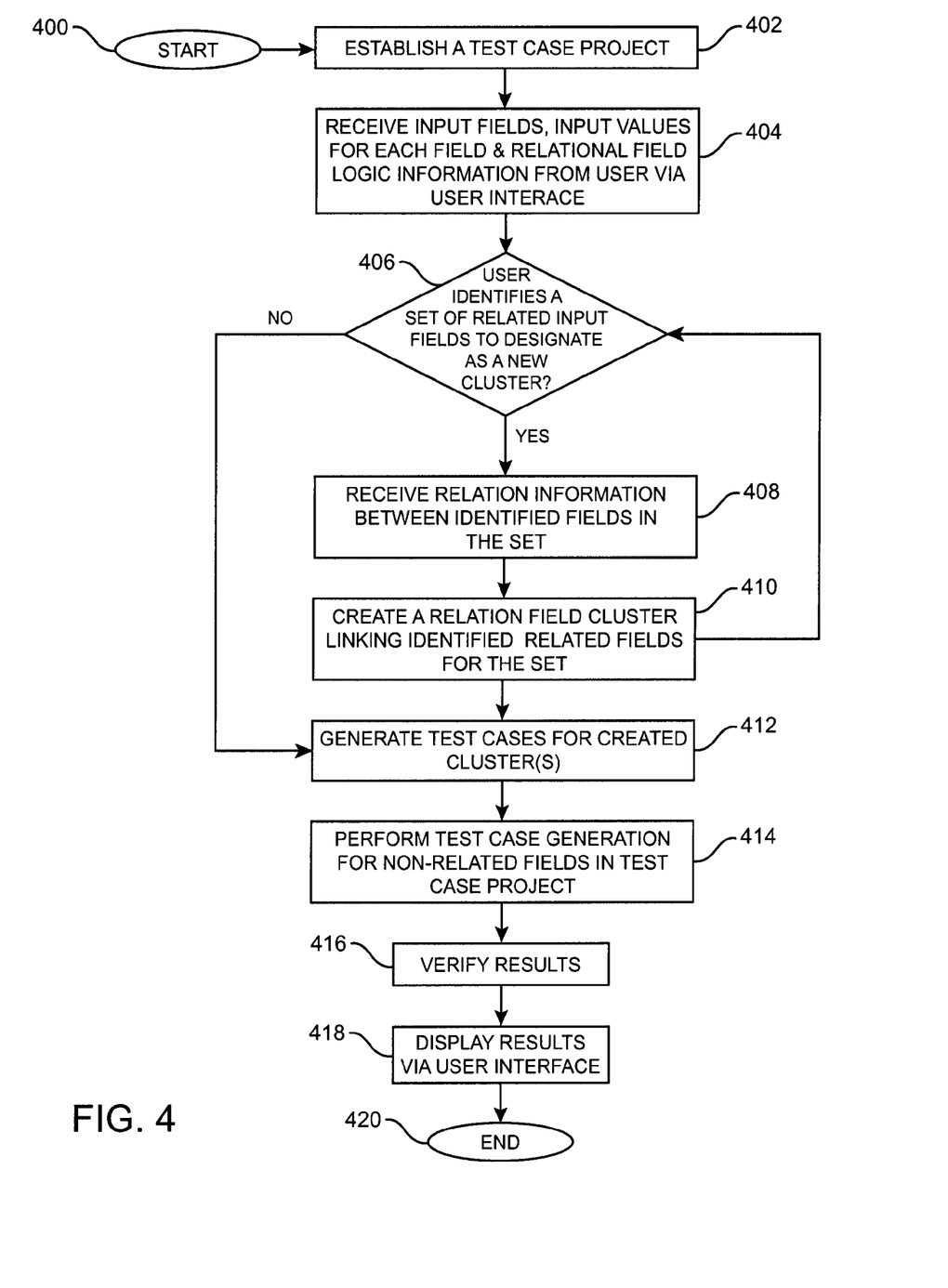
FIG. 4 is an example flow chart diagram depicting portions of processes performed by at least the efficient test case generator module in accordance with the present disclosure.

FIG. 4 is an example flow chart diagram depicting portions of processes performed by at least the efficient test case generator module in accordance with the present disclosure. At the Start (Block 400), the efficient test case generator module 300 is instructed by the user via the user interface module 302 to establish a test case project (Block 402). The test case project can be established by creating a new test case project or loading an existing test case project from memory. In the case of a new test case project, the user inputs data values directly into designated fields in the user interface. In the case of an existing test case project, the efficient test case generator module 300 is configured such that the input data is loaded from memory and automatically populated in the designated fields. In either case, the input data can be given in accordance with a single service or a scenario.

In particular to the input data that the user places in the user interface, some of the input data includes, but is not limited to, the number of fields to be generated; the field name, the data type; the field size; positive and negative values for each field, relational information among two or more fields and the like. The field name is the field in which the values need to be provided by the user. The data type represents the type of data of the field that is to be tested in the test case project. The field size is the size of the string if the field name is a string type.

The positive and negative values are provided in a value field that is displayed in the user interface, whereby values can be hardcoded positive or negative values and/or can be query based. When the values are query based, a query is taken as input. If the query gives multiple values, each value will participate in the test case creation. In an aspect, the efficient test case generator module 300 is configured to link queries to values of other fields to function as a single grouped set of data that is tested. The positive and negative values are computed by standard and negative test case executioner component 308, shown in FIG. 3.

In addition to receiving input data values from the user, the user interface module prompts the user to identify a first set of one or more input fields which have a dependency or relation to one another (Block 406). Based on the specific application in which the tested item is to be used, the user can identify two or more fields that are designated by the user to be dependent on at least one another. Additionally, the user can provide one or more defined logic rules, that can be part of the created relation field cluster(s) or handled independent of the cluster(s), which are to be verified by the output verifier component 312. Upon receiving such relational information (Block 408), the filtering module 312 creates a relational field cluster which identifies the two or more fields that are related to or dependent upon one another and defines the relational login rules between those fields and their associated values (Block 410).

The created relation field cluster can also be stored in a memory by the efficient test case generator module 300 for later retrieval and processing. The efficient test case generator module 300 is configured to allow the user to select and identify, via the user interface, more than one set of related fields (along with their associated values), whereby the filtering module 312 will creates additional relational field clusters for each separate set of related fields identified by the user. This information can be gathered before any test case generation methods are performed, as shown by the arrow from Block 410 to Block 406.

Once the user has identified all the sets of fields that are considered related, and the filtering module 312 has created each corresponding relational field cluster, the test case generators and executioner components 304, 306, 308 perform one or more test case generation methods separately on each created relational field cluster (Block 412). Additionally, the efficient test case generator module 300 will perform the test case generation method on all remaining input fields which have not been identified and designated in a relational field cluster (Block 414). The output verifier module 310 of the efficient test case generator module 300 thereafter compares the results of the test case generation with one or more user defined logic rules in the relational field cluster (Block 416). The efficient test case generator module 300 thereafter displays the results of the test case generation and provides information to the user (Block 420). The process thereafter ends (Block 422).

An example in accordance with the process in FIG. 4 will be discussed below. It should be noted that the following is only an example with a selected number of field inputs, a selected number of values for each field and example field relationship information. Thus, it is not be construed that the method in FIG. 4 is limited to the present example discussed herein as the overall process can account for additional or lesser number of field inputs and values for each field. Further, the method in FIG. 4 is not limited to the particulars of the values or relationship information discussed herein, as the following is only meant as an example for explanatory purposes.

In the present example, the efficient test case generator module 300 is to test for all the possible test conditions while using an optimized number of test cases. In the example, a source code is designed to receive inputs A, B, C, D and E and has the following snippet of code, wherein each input can only receive a Y or N value. The example software code is shown below:

```
if (A==B) && (C==N) {
.......
......
}
if (C=='Y') && (A!=B) {
.........
........
}
if ((C=='N') || (A=='N')) {
.........
........
}
if (D == 'Y') {
}
if (E=='N') {
}
```

Under the Cartesian product, the total number of test cases that would be required to ensure that all possible conditions are covered the Cartesian Product utilizes the formula $R^n$ in which R is the number of possible values for each input field n. Thus, in the present cases, $2^5$ or 32 test cases would need to computed based on 2 possible values (i.e. Y or N) for 5 input field (A, B, C, D and E).

In the present example, the above code provides dependency or relationship information between some of the input fields. In particular, input fields A, B and C are related to each other, whereas inputs D and E are independent of the others. The filtering module 312 of the efficient test case generator module 300 receives and processes the relational data to create a relational field cluster which defines one or more relationships and/or dependencies among two or more input fields and/or values among two or more input fields.

In the present example, the relational field cluster defines a dependency between fields A, B, and C, thereby reducing the n number of fields in the Cartesian Product to a value of 3. As discussed, the directed test case generator and executioner components 304, 306 will run the test case generation technique only on the values and fields that are identified and defined in the relational field cluster, thereby significantly reducing the number of test cases which need to be considered. It should be noted that the user is able to designate more than one set of fields that are dependent, whereby the filtering module 312 creates an additional relational field cluster for each set of user designated related or dependent fields.

Each defined relational field cluster created by the filtering module 312 is processed separately by the efficient test case generator 300 in computing all the possible test cases in a test case project. In particular, the efficient test case generator 300 performs a separate Cartesian Product on each relational field cluster to generate all the possible test cases for the identified related fields.

In the present example, considering that input fields D and E are independent of the other fields, they are not part of the relational field cluster and undergo the test case generation separately. Accordingly, the efficient test case generator module 300 generates a full expanded set of test cases for independent input fields D and E. In the present example, the relational definition parameter information provided by the filtering module 312 may be represented as shown in Table 1.

TABLE 1

| Input Field | Related to Fields | Possible values for Field |
|---|---|---|
| A | B, C | Y, N |
| B | A, C | Y, N |
| C | B | Y, N |
| D | None (Indep.) | Y, N |
| E | None (Indep.) | Y, N |

In addition, the relational field cluster created by the filtering module 312 includes the following relational logic rules shown in Table 2. The relational logic rules are preferably provided to the filtering module 312 by the user, either manually or loaded from a file, using the user interface 302. As discussed, the test case executioner components 304, 306, 308 utilize the relational information between fields that is provided in the defined relational field cluster to generate the optimal number of test cases, whereas the output verifier module 310 uses the defined relational logic information to confirm which test cases have satisfied (and/or not satisfied) the defined logic rules.

TABLE 2

| Relation Definition No. | Defined Relational Logic |
|---|---|
| 1 | If Value in Field A = Value in Field C; AND Value in Field C = N, then satisfactory |
| 2 | If Value in Field C = Y; AND Value in Field A is not = Value in Field B, then satisfactory |
| 3 | If Value in Field C = N; OR Value in Field A = N, then satisfactory |
| 4 | If Value in Field D = Y, then satisfactory |
| 5 | If Value in Field E = N, then satisfactory |

Table 3 below illustrates the test case results for the input fields and values generated by the test case executioner components 304, 306, 308 for the relational field cluster for fields A, B, C.

TABLE 3

| Number of Test Case | Input Fields Considered in Relational Definition Parameter | Generated Conditions for Field A | Generated Conditions for Field B | Generated Conditions for Field C | Generated Conditions for Field D | Generated Conditions for Field E |
|---|---|---|---|---|---|---|
| 1 | A, B, C | Y | N | N | N | N |
| 2 |  | N | N | N | N | N |
| 3 |  | Y | Y | N | N | N |
| 4 |  | N | Y | N | N | N |
| 5 |  | Y | N | Y | N | N |
| 6 |  | N | N | Y | N | N |
| 7 |  | Y | Y | Y | N | N |
| 8 |  | N | Y | Y | N | N |

As shown in Table 3, the efficient test case generator module 300 takes into account the relational field cluster information between fields A, B and C to produce only the possible combinations that are relevant to the tested item. Considering that the relational field cluster identifies only 3 fields are to be tested with only 2 possible associated values, the test case executioner components 304, 306, 308 utilize an n value of 3 and a R value of 2 for the Cartesian Product test generation. This results in the test case executioner components 304, 306, 308 being able to compute all the possible combinations within 8 test cases (as opposed to 32 test cases if no relational information was provided).

In the present example, the efficient test case generator module 300 tests independent fields D and E, which do not have any relational information within the relation definition parameter, to generate the remaining possible combinations for these independent fields. The results computed by the efficient test case generator module 300 are shown in Table 4.

possible combinations, without the benefit of dependencies between fields, A, B and C, would require testing 32 cases.

In the present example, the output verifier component 310 of the efficient test case generator module 300 verifies the results and compares them with the relational logic rules, shown in Table 2, to identify which of the test cases satisfy (and/or do not satisfy) the defined logic rules. The results for this particular example may be output and displayed by the efficient test case generator module 300 via the user interface, as shown in Table 5.

Based on the results, the user is able to view, via the use interface, which test cases do not satisfy the defined logic rules. From this information, the user is able to revise the test item to correct these failures.

While embodiments and applications have been shown and described, it would be apparent to those skilled in the art having the benefit of this disclosure that many more modifi-

TABLE 4

| Number of Test Case | Input Fields Considered in Relational Definition Parameter | Generated Conditions for Field A | Generated Conditions for Field B | Generated Conditions for Field C | Generated Conditions for Field D | Generated Conditions for Field E |
|---|---|---|---|---|---|---|
| 9 | N/A | N | N | N | Y | N |
| 10 |  | N | N | N | N | Y |

Based on the results provided in Tables 3 and 4, the efficient test case generator module 300 is able to compute all the possible results within a total number of 10 test cases. As stated above, using the Cartesian product to test all of the cations than mentioned above are possible without departing from the inventive concepts disclosed herein. The invention, therefore, is not to be restricted except in the spirit of the appended claims.

TABLE 5

| Relation Definition No. (Defined Relational Logic) | Result Satisfies Defined Relational Logic? | Identified Test case(s) |
|---|---|---|
| 1.) If Value in Field A = Value in Field C; AND Value in Field C = N, then satisfactory | True | 2, 3, 9, 10 |
| 1.) If Value in Field A = Value in Field C; AND Value in Field C = N, then satisfactory | False with only First condition false | 1, 4 |
| 1.) If Value in Field A = Value in Field C; AND Value in Field C = N, then satisfactory | False with only Second condition false | 5, 8 |

TABLE 5-continued

| Relation Definition No. (Defined Relational Logic) | Result Satisfies Defined Relational Logic? | Identified Test case(s) |
|---|---|---|
| 1.) If Value in Field A = Value in Field C; AND Value in Field C = N, then satisfactory | False with both the condition false | 6, 7 |
| 2.) If Value in Field C = Y; AND Value in Field A is not = Value in Field B, then satisfactory | True | 5, 8 |
| 2.) If Value in Field C = Y; AND Value in Field A is not = Value in Field B, then satisfactory | False with only First condition false | 6, 7 |
| 2.) If Value in Field C = Y; AND Value in Field A is not = Value in Field B, then satisfactory | False with only Second condition false | 1, 4 |
| 2.) If Value in Field C = Y; AND Value in Field A is not = Value in Field B, then satisfactory | False with both the condition false | 2, 3 |
| 3.) If Value in Field C = N; OR Value in Field A = N, then satisfactory | False | 5, 7 |
| 3.) If Value in Field C = N; OR Value in Field A = N, then satisfactory | True with only First condition true | 1, 3 |
| 3.) If Value in Field C = N; OR Value in Field A = N, then satisfactory | True with only Second condition true | 6, 8 |
| 3.) If Value in Field C = N; OR Value in Field A = N, then satisfactory | True with both the condition true | 2, 4 |
| 4.) If Value in Field D = Y, then satisfactory | False | 9 |
| 4.) If Value in Field D = Y, then satisfactory | True | 10 |
| 5.) If Value in Field E = N, then satisfactory | False | 9 |
| 5.) If Value in Field E = N, then satisfactory | True | 1, 2, 3, 4, 5, 6, 7, 8 |

What is claimed is:

1. A method of providing an efficient test case generator, the method comprising:
   establishing a test case project upon request from a user via a user interface to test an item, the test case project including a plurality of fields and corresponding designated values to be tested for the item;
   receiving, via the user interface, a first set of identified fields of the plurality, wherein the first set includes two or more fields identified by the user as having a dependent relationship with at least one another;
   creating, using one or more processors, a first relational field cluster for the first set of related fields and their associated values;
   performing, using one or more processors, a test case generation technique on the first relational field cluster to compute all possible test conditions among the two or more identified fields and their associated values in the first set; and
   displaying results of the computed test conditions for at least the two or more identified fields and their associated values of the first relational field cluster.

2. The method of claim 1, further comprising:
   receiving, via the user interface, a second set of related fields from the user, wherein the second set includes two or more fields identified by the user as having a dependent relationship with at least one another;
   creating a second relational field cluster associated with the second set of related fields and their associated values;
   performing, using one or more processors, the test case generation technique on the second relational field cluster to compute all possible test conditions among the two or more identified fields and their associated values in the second set; and
   displaying results of the computed test conditions for at least the two or more identified fields and their associated values of the second relational field cluster.

3. The method of claim 1, wherein at least the first relational field cluster includes one or more logic rules provided by the user via the user interface, the one or more logic rules being associated among the two or more identified fields and their associated values.

4. The method of claim 3, further comprising:
   comparing the results of the computed test conditions for at least the two or more identified fields and their associated values of the first set with the one or more logic rules; and
   indicating, via the user interface, one or more test cases having a result in compliance with the one or more logic rules.

5. The method of claim 1, wherein the test case generation technique further comprises a Cartesian Product.

6. The method of claim 1, further comprising:
   performing the test case generation method on all remaining fields and their associated values that are independent and not related to one or more other fields to compute all possible test conditions for the remaining fields;
   displaying results of the computed test conditions for the remaining fields.

7. The method of claim 1, wherein the plurality of fields and their associated values are at least partially loaded from a storage memory via the user interface.

8. A non-transitory machine readable medium having stored thereon instructions for providing an efficient test case generator module, comprising machine executable code which when executed by at least one machine, causes the machine to:

establish a test case project upon request from a user via a user interface to test an item, the test case project including a plurality of fields and corresponding designated values to be tested for the item;

receive, via the user interface, a first set of identified fields of the plurality, wherein the first set includes two or more fields identified by the user as having a dependent relationship with at least one another;

create a first relational field cluster for the first set of related fields and their associated values;

perform a test case generation technique on the first relational field cluster to compute all possible test conditions among the two or more identified fields and their associated values in the first set; and display results of the computed test conditions for at least the two or more identified fields and their associated values of the first relational field cluster.

9. The machine readable medium of claim 8, wherein the machine executable code which when executed by at least one machine, causes the machine to:

receive, via the user interface, a second set of related fields from the user, wherein the second set includes two or more fields identified by the user as having a dependent relationship with at least one another;

create a second relational field cluster associated with the second set of related fields and their associated values;

perform the test case generation technique on the second relational field cluster to compute all possible test conditions among the two or more identified fields and their associated values in the second set; and display results of the computed test conditions for at least the two or more identified fields and their associated values of the second relational field cluster.

10. The machine readable medium of claim 8, wherein at least the first relational field cluster includes one or more logic rules provided by the user via the user interface, the one or more logic rules being associated among the two or more identified fields and their associated values.

11. The machine readable medium of claim 10, wherein the machine executable code which when executed by at least one machine, causes the machine to:

compare the results of the computed test conditions for at least the two or more identified fields and their associated values of the first set with the one or more logic rules; and indicate, via the user interface, one or more test cases having a result in compliance with the one or more logic rules.

12. The machine readable medium of claim 8, wherein the test case generation technique further comprises a Cartesian Product.

13. The machine readable medium of claim 8, wherein the machine executable code which when executed by at least one machine, causes the machine to:

perform the test case generation method on all remaining fields and their associated values that are independent and not related to one or more other fields to compute all possible test conditions for the remaining fields;

display results of the computed test conditions for the remaining fields.

14. The machine readable medium of claim 8, wherein the plurality of fields and their associated values are at least partially loaded from a storage memory via the user interface.

15. A computer system comprising:

a memory;

a processor coupled to the memory, the processor operative to:

establish a test case project upon request from a user via a user interface to test an item, the test case project including a plurality of fields and corresponding designated values to be tested for the item;

receive, via the user interface, a first set of identified fields of the plurality, wherein the first set includes two or more fields identified by the user as having a dependent relationship with at least one another;

create a first relational field cluster for first set of related fields and their associated values;

perform a test case generation technique on the first relational field cluster to compute all possible test conditions among the two or more identified fields and their associated values in the first set; and display results of the computed test conditions for at least the two or more identified fields and their associated values of the first relational field cluster.

16. The computer system of claim 15, wherein the processor is configured to:

receive, via the user interface, a second set of related fields from the user, wherein the second set includes two or more fields identified by the user as having a dependent relationship with at least one another;

create a second relational field cluster associated with the second set of related fields and their associated values;

perform the test case generation technique on the second relational field cluster to compute all possible test conditions among the two or more identified fields and their associated values in the second set; and display results of the computed test conditions for at least the two or more identified fields and their associated values of the second relational field cluster.

17. The computer system of claim 15, wherein at least the first relational field cluster includes one or more logic rules provided by the user via the user interface, the one or more logic rules being associated among the two or more identified fields and their associated values.

18. The computer system of claim 17, wherein the processor is configured to:

compare the results of the computed test conditions for at least the two or more identified fields and their associated values of the first set with the one or more logic rules; and indicate, via the user interface, one or more test cases having a result in compliance with the one or more logic rules.

19. The computer system of claim 15, wherein the test case generation technique further comprises a Cartesian Product.

20. The computer system of claim 15, wherein the processor is configured to:

perform the test case generation method on all remaining fields and their associated values that are independent and not related to one or more other fields to compute all possible test conditions for the remaining fields;

display results of the computed test conditions for the remaining fields.

21. The computer system of claim 15, wherein processor is configured to load at least some of the plurality of fields and their associated values from the memory.

* * * * *